US008843506B2

(12) United States Patent  
Chen et al.

(10) Patent No.: US 8,843,506 B2
(45) Date of Patent: Sep. 23, 2014

(54) SYSTEM, METHOD, AND APPARATUS FOR REPLICATING A PORTION OF A CONTENT REPOSITORY

(75) Inventors: Feng-Wei Chen, Cary, NC (US); Michael T Donaghy, Raleigh, NC (US); William T Pack, Apex, NC (US); Nikhil Parekh, Raleigh, NC (US); Jacques-Marie Thrasybule, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 12/499,444

(22) Filed: Jul. 8, 2009

(65) Prior Publication Data

US 2011/0010341 A1 Jan. 13, 2011

(51) Int. Cl.
*G06F 17/30* (2006.01)

(52) U.S. Cl.
CPC ................... *G06F 17/30176* (2013.01)
USPC ............... 707/760; 707/759; 707/769

(58) Field of Classification Search
USPC .......................... 707/760, 758, 769
See application file for complete search history.

(56) References Cited

U.S. PATENT DOCUMENTS

| 5,130,924 | A  | * | 7/1992  | Barker et al.  | 715/205     |
| 6,766,316 | B2 | * | 7/2004  | Caudill et al. | 1/1         |
| 7,340,505 | B2 | * | 3/2008  | Lisiecki et al.| 709/217     |
| 7,496,914 | B1 | * | 2/2009  | Ling et al.    | 717/178     |
| 7,693,812 | B2 | * | 4/2010  | Lim et al.     | 707/999.001 |
| 8,595,249 | B2 | * | 11/2013 | Jackson        | 707/758     |
| 2005/0234957 | A1 | * | 10/2005 | Olson et al. | 707/101     |
| 2006/0036592 | A1 | * | 2/2006  | Das et al.   | 707/4       |
| 2008/0134016 | A1 | * | 6/2008  | Niemoller et al. | 715/234 |
| 2008/0172360 | A1 | * | 7/2008  | Lim et al.   | 707/3       |
| 2009/0138936 | A1 | * | 5/2009  | Biderman     | 725/134     |
| 2010/0005122 | A1 | * | 1/2010  | Jackson      | 707/104.1   |
| 2010/0145986 | A1 | * | 6/2010  | Lim et al.   | 707/769     |

* cited by examiner

*Primary Examiner* — Apu Mofiz
*Assistant Examiner* — Jared Bibbee
(74) *Attorney, Agent, or Firm* — Jeffrey T. Holman

(57) ABSTRACT

A computer-implemented method for selecting a portion of a content repository for replication including receiving an input describing one or more desired relationship patterns for replication, generating a query for the desired relationship patterns, identifying content items of a content repository matching the desired relationship patterns, and selecting the identified content items of the content repository. The input is received at a graphical user interface (GUI). The GUI operates on a computer. The relationship patterns are associated with an ontology describing relationships between content items in a content repository. The content repository includes a plurality of content items.

19 Claims, 6 Drawing Sheets

SYSTEM, METHOD, AND APPARATUS FOR REPLICATING A PORTION OF A CONTENT REPOSITORY

BACKGROUND

Computer-based information sharing has become prevalent tool in many fields. Information stored in a content store may be accessed to provide information. Some content stores contain an enormous quantity of content items, and a user may use these content stores to answer questions, solve problems, and create solutions.

One example of a content store is a wiki. A wiki is a simple online database that allows users to collaboratively create a knowledge management system. In many wikis, users can create and edit content items within the wiki. The collaborative nature of the wiki often allows it to be accessed and modified by a large number of users. Consequently, the size of the content of the wiki can likewise become relatively large.

Large content stores containing prodigious amounts of information can be a great benefit to a user seeking an answer to a question or a solution to a problem. When the user has access to relatively high storage and/or network bandwidth, manipulation of a large content store is a trivial matter. However, when a user does not have relatively high storage capacity or network bandwidth, accessing a large content store can become problematic. For example, a consultant may be on a customer engagement in a location lacking Internet access. In another example, the data in the content store may be proprietary and inaccessible over the Internet, and a consultant on a customer engagement may therefore be unable to access the content store.

To address this problem, a user may replicate content items in the content store to a storage device to enable access to those particular content items. In the special case of the content store that is not particularly large, the entire content store may be replicated onto a storage device, such as a laptop hard drive. When the content store is relatively large, however, it may be impractical to replicate the entire content store to a portable storage device, and the user may attempt to replicate a limited number of content items to a storage device by selecting individual content items. This, however, introduces a new problem: determining which content items to select for replication. As the size of the content store becomes larger, determining which items to replicate becomes particularly problematic.

SUMMARY

Embodiments of a computer-implemented method for selecting a portion of a content repository for replication are described. In one embodiment, the computer-implemented method includes receiving an input describing one or more desired relationship patterns for replication, generating a query for the desired relationship patterns, identifying content items of a content repository matching the desired relationship patterns, and selecting the identified content items of the content repository. The input is received at a graphical user interface (GUI). The GUI operates on a computer. The relationship patterns are associated with an ontology describing relationships between content items in the content repository. The content repository includes a plurality of content items. Other embodiments of the computer-implemented method are also described.

Embodiments of a computer program product for replicating a portion of a content repository are also described. In one embodiment, the computer program product includes a computer useable storage medium to store a computer readable program. The computer readable program, when executed on a computer, causes the computer to perform operations including receiving an input describing one or more desired relationship patterns for replication, generating a query for the desired relationship patterns, and identifying content items of the content repository matching the desired relationship patterns. The computer program product also includes operations for selecting the identified content items of a content repository, extracting the identified content items, and storing the identified content items on a storage device. The input is received at a graphical user interface (GUI). The relationship patterns are associated with an ontology describing relationships between content items in the content repository. The content repository includes two or more content items. Other embodiments of the computer program product method are also described.

Embodiments of a system are also described. In one embodiment, the system is a system for replicating a portion of a content repository. The system includes a content repository to store a plurality of content items, a client computer, and a replication server. The client computer operates a graphical user interface (GUI) to receive an input describing one or more desired relationship patterns for replication. The relationship patterns are associated with an ontology describing relationships between content items in the content repository. The replication server operates an ontology manager to describe the ontology, a semantic engine to identify content items of the content repository matching the desired relationship patterns, and a replication engine to extract the identified content items and store the identified content items on a storage device. Other embodiments of the system are also described.

Embodiments of an apparatus for replicating a portion of a content repository are also described. The apparatus includes a graphical user interface (GUI), a semantic engine, and a replication engine. The GUI receives an input describing one or more desired relationship patterns for replication. The relationship patterns are associated with an ontology describing relationships between content items in a content repository. The semantic engine identifies content items of the content repository matching the desired relationship patterns. The replication engine extracts the identified content items and stores the identified content items on a storage device. Other embodiments of the apparatus are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
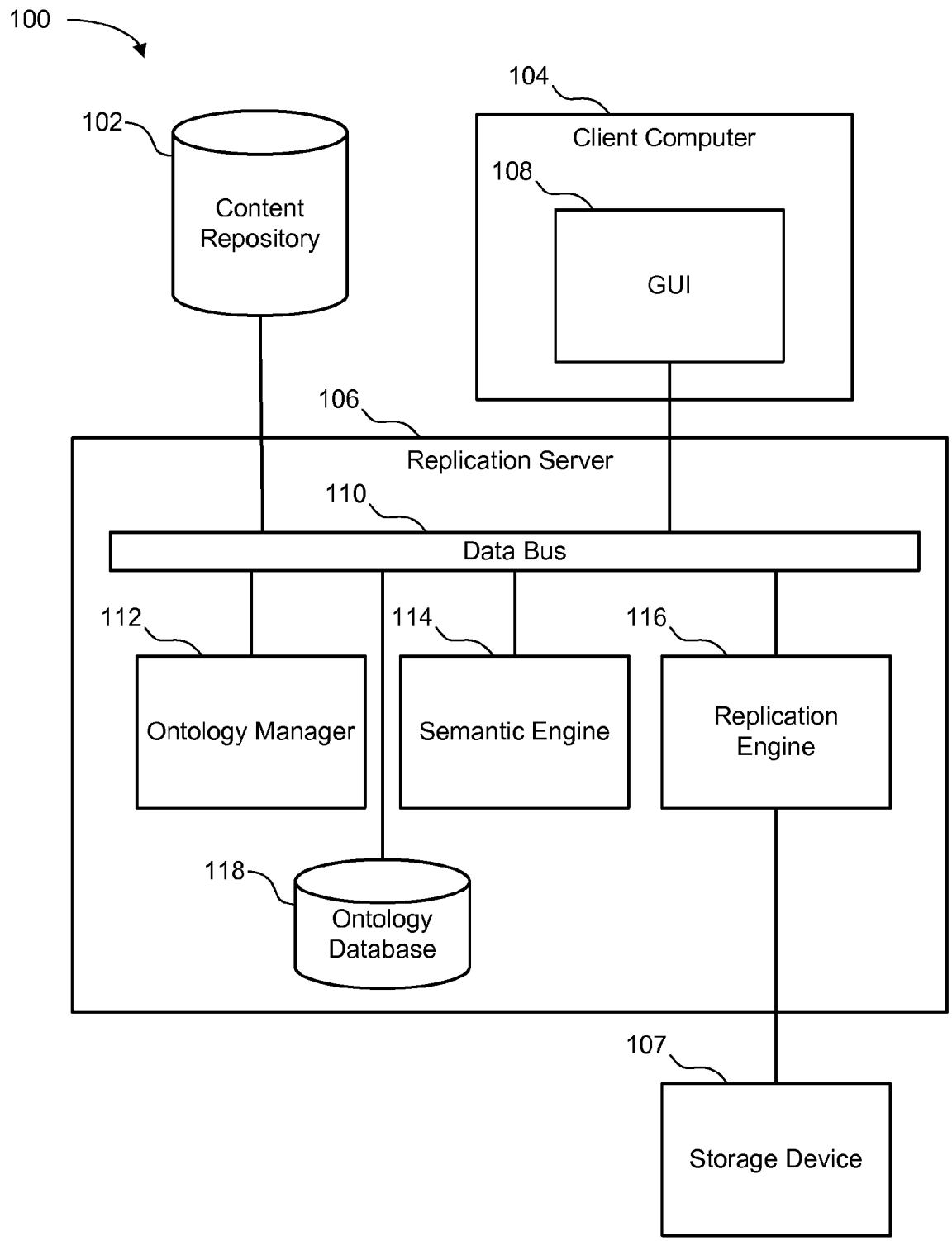
FIG. 1 depicts a schematic diagram of one embodiment of a system for replicating a portion of a content repository.

FIG. 1 depicts a schematic diagram of one embodiment of a system 100 for replicating a portion of a content repository 102. The system 100 includes a content repository 102, a client computer 104, a replication server 106, and a storage device 107. The system 100 selects content items in the content repository 102 for replication based on an ontology describing relationships between content items in the content repository 102 and user input describing relationships for desired content items.

The content repository 102, in one embodiment, contains a plurality of content items. The content repository 102 may be any type of content repository 102 capable of storing content items. For example, the content repository 102 may be a database referencing a plurality of digital documents. An example of a content repository 102 is a wiki-based collaborative system.

The content repository 102 may operate on one or more computer systems separate from other components in the system 100. For example, the content repository 102 may operate on a wiki server computer (not shown) separate from the client computer 104 and the replication server 106. In an alternative embodiment, the content repository 102 operates at least in part on the same computer system as another component in the system 100. For example, the content repository 102 may operate on the replication server 106.

In certain embodiments, the content repository 102 is accessed over a network (not shown). For example, the content repository 102 may be accessible over the Internet. In an alternative embodiment, the content repository 102 is in direct communication with another component of the system 100. For example, the content repository 102 may be directly connected to an element of the replication server 106.

The content repository 102 may be a content repository 102 related to a product. For example, the content repository may describe a product and contain content items relating to that product. The content items relating to the product may be of many types, including, but not limited to, marketing documents, training documents, help documents, and technical information.

In some embodiments, the content repository 102 includes a collaboration mechanism (not shown). The collaboration mechanism allows a plurality of users to collaborate to create and/or maintain content items in the content repository 102. In certain embodiments, the collaboration mechanism allows a plurality of users to create and/or maintain relationships between the content items in the content repository 102. Examples of collaboration mechanisms include, but are not limited to, a social structure of individuals and organizations, email, instant messaging, wikis, weblogs (blogs), media sharing, such as audio, picture, and video sharing, collaborative tagging and subject indexing, and an avatar-based virtual world.

The client computer 104, in one embodiment, operates a graphical user interface (GUI) 108 that receives input from a user. In one embodiment, the client computer 104 is separate from other components of the system 100 and is connected via a network connection to one or more other components of the system 100. For example, the client computer 104 may be a standalone computer system connected via the Internet to the replication server 106. The client computer 104 maybe any type of computer capable of operating the GUI 108. For example, the client computer 104 may be a personal computer.

The GUI 108, in one embodiment, is an application operating on the client computer 104 that provides an interface to communicate with a user. In an alternative embodiment, the GUI 108 operates on the replication server 106. The GUI 108 receives input from a user indicating one or more relationship patterns between two or more content items that the user wishes to replicate. Relationship patterns are described in greater detail in relation to the ontology manager 112 described below. And embodiment of the GUI 108 is described in greater detail in relation to FIG. 2 below.

In one embodiment, the replication server 106 determines content items in the content repository 102 to replicate based on the input to the GUI 108. The replication server 106 includes a data bus 110, an ontology manager 112, a semantic engine 114, and a replication engine 116. The replication server 106 determines which content items satisfy the constraints of the relationship patterns input into the GUI 108 and selects those content items for replication.

The replication server 106 may be any type of computer capable of operating the components of replication server 106. For example, the replication server may be a server system operating in a data center (not shown). In an alternative embodiment, the replication server 106 includes one or more other components of the system 100. For example, the replication server 106 may include the content repository 102 and/or the GUI 108.

The data bus 110, in one embodiment, provides a data pathway for communication between components of the replication server 106 and other components of the system 100. The data bus 110 may include any type of device capable of communicating digital data. The data bus 110 may include or be a combination of an internal bus, an external bus, a serial bus, a parallel bus, a network connection, a peripheral bus, or another type of data communication system. In some embodiments, at least part of the data bus 110 is implemented in software.

In some embodiments, the ontology manager 112 manages an ontology that describes one or more relationships between content items in the content repository 102. The ontology is a data model describing a domain of content items in the content repository 102 and relationships between those content items. For example, the content repository 102 may include a first content item and a second content item. The ontology manager 112 may manage an ontology that indicates that the first content item contains the second content item.

The ontology manager 112 may describe any type of relationship between two or more content items. Examples of relationships that the ontology manager 112 may describe include, but are not limited to, contains, drives, chooses, consists of, deploys to, recommends, provides, is supported by, is described by, is a help document for, and is a product description of. The ontology manager 112 may also include any other type of possible relationship between two content items. In some embodiments, the ontology manager 112 allows a user to define a type of relationship that may exist between two or more content items.

In one embodiment, the ontology managed by the ontology manager 112 is created via manual input by one or more users. For example, users may indicate one or more relationships over time as the content repository 102 is accessed by users. In another example, one or more administrators define relationships between content items to create the ontology.

The ontology manager 112, in one embodiment, accesses an ontology database 118. The ontology database 118 maintains short statements that describe the relationships between content items in the content repository. For example, the ontology database 118 may be a triplestore containing resource description framework (RDF) metadata.

In an alternative embodiment, the ontology is stored in one or more tags associated with content items in the content repository 102. For example, a content item in the content repository 102 may include a tag indicating that the content item is related to another content item. The tag may also indicate the type of relationship between the content items. The ontology manager 112 accesses the tags by accessing the content repository 102.

The semantic engine 114, in one embodiment, compares the input from the GUI 108 to the ontology to select content items in the content repository 102 that satisfy the input from the GUI 108. The semantic engine 114 generates a query executed against the ontology database 118, in one embodiment. The output of the query execution describes content items in the content repository 102 that match the request from the GUI 108. The semantic engine 114 is described in greater detail in relation to FIG. 3 below.

In one embodiment, the replication engine 116 receives an output from the semantic engine 114 indicating selected content items in the content repository 102. The replication engine 116 replicates the selected content items from the content repository 102 to the storage device 107.

The storage device 107, in one embodiment, stores the content items indicated by the replication engine 116. The storage device 107 may be any type of storage device capable of storing content items. In some embodiments, the storage device is a portable storage device. For example, the storage device 107 may be a hard drive on a laptop computer. In another example, the storage device 107 may be a flash drive.

Figure 2:
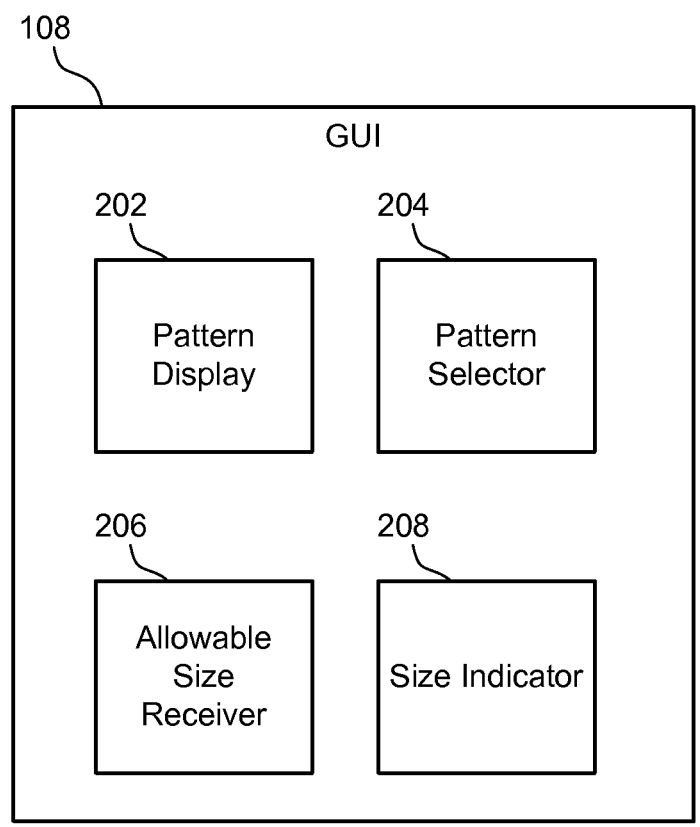
FIG. 2 depicts a schematic diagram of one embodiment of the GUI of FIG. 1.

FIG. 2 depicts a schematic diagram of one embodiment of the GUI 108 of FIG. 1. The GUI 108 includes a pattern display 202, a pattern selector 204, an allowable size receiver 206, and a size indicator 208. The GUI 108 communicates with a user to receive inputs indicating relationship patterns to use for replication and provide outputs indicating results of the inputs.

The pattern display 202, in one embodiment, displays one or more relationship patterns that a user may specify for replication. For example, the pattern display 202 may display the types relationships for a particular content item and allow the user to select which of those types of relationships should be used to determine which other content items should be replicated. In one embodiment, the pattern display 202 provides a graphical display showing a selected content item and other related content items.

The pattern selector 204, in one embodiment, receives an input from user indicating relationship patterns to be used for replication. The inputs indicate that a relationship pattern is selected. The pattern selector 204 may also receive inputs indicating that a relationship pattern is deselected. The pattern selector 204 may receive inputs indicating relationship type. The pattern selector 204, in some embodiments, receives an input indicating the type of content item that should be replicated. For example, the pattern selector 204 may receive an input indicating that product documentation should be replicated.

In some embodiments, the pattern selector 204 receives an input indicating a degree of relatedness required for replication. For example, the pattern selector 204 may receive an input indicating that content items related through transitive relationships must be at or below a threshold level of transitive steps away from the initial content item.

The allowable size receiver 206 receives an allowable size for replicated content in one embodiment. The allowable size receiver 206 receives the allowable size as an input from a user. In an alternative embodiment, the allowable size receiver 206 receives the allowable size as a digital input from a different component of the system 100. For example, the storage device 107 may communicate free space available for replicated content items to the allowable size receiver 206.

In one embodiment, the size indicator 208 indicates the size of replicated content items based on the selected relationship patterns. In one embodiment, the size indicator displays the total size for replicated items in terms of bits or bytes used. In an alternative embodiment, the size indicator 208 indicates the size of replicated content items relative to the allowable size. For example, the size indicator 208 may display a red icon in response to the size of replicated items based on selected relationship patterns being greater than the allowable size, and a green icon in the alternative.

Figure 3:
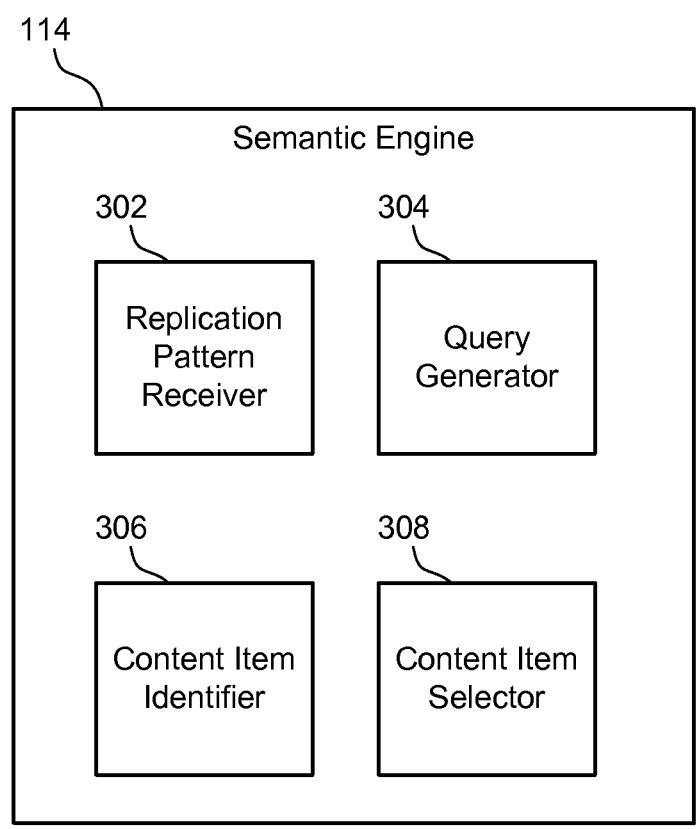
FIG. 3 depicts a schematic diagram of one embodiment of the semantic engine of FIG. 1.

FIG. 3 depicts a schematic diagram of one embodiment of the semantic engine 114 of FIG. 1. The semantic engine 114 includes a replication pattern receiver 302, a query generator 304, a content item identifier 306, and a content item selector 308. The semantic engine 114 determines content items that match the desired relationship pattern or patterns.

The replication pattern receiver 302, in one embodiment, receives one or more replication patterns to be used to determine content items to replicate. The replication pattern receiver 302 receives the replication patterns from the GUI 108. The replication pattern receiver 302 may be any hardware or software element capable of receiving information describing one or more relationship patterns.

In one embodiment, the query generator 304 generates a query based on the received relationship patterns. The query generated by the query generator 304 may be any type of query capable of retrieving output from the ontology database 118. For example, the ontology database 118 may be a triplestore, and the query may be a SPARQL Protocol and RDF Query Language (SPARQL) query. The query may include triple patterns, conjunctions, disjunctions, and optional patterns. In another example, the ontology database 118 may be a relational database, and the query may be a structured query language (SQL) query.

The content item identifier 306, in one embodiment, identifies one or more content items for replication based on the query generated by the query generator 304. The content item identifier 306 identifies the content items by processing the query against the ontology database 118. The output of the content item identifier 306 is one or more references to content items in the content repository 102 that satisfy the query.

The content item selector 308, in one embodiment, indicates that the content items identified by the content item identifier 306 are selected for replication. The content item selector 308 provides the selected content items to the replication engine 116. In some embodiments, the continent selector 308 provides the selected content items to the GUI 108 for display to a user and/or computation of the size of selected content items.

Figure 4:
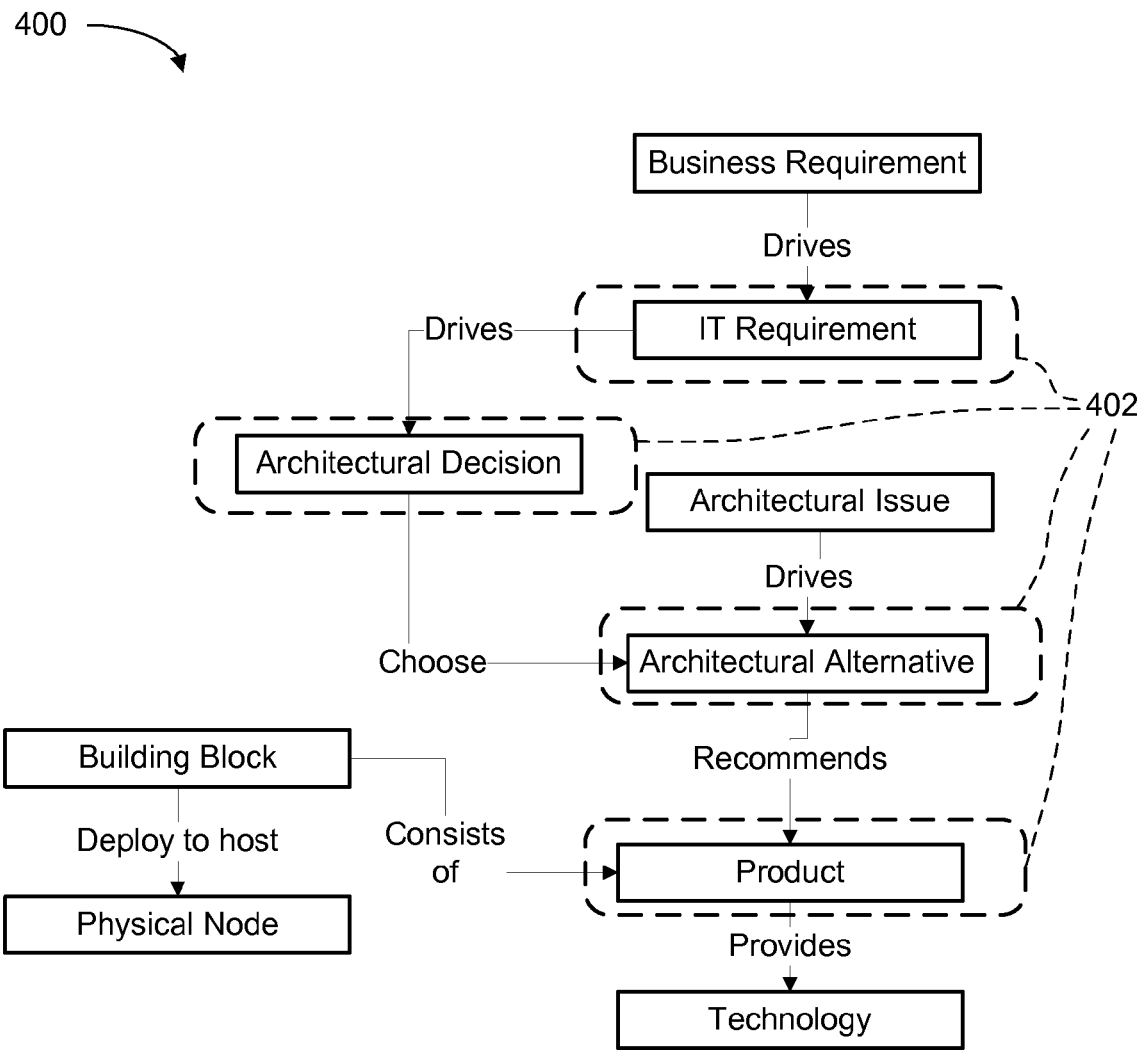
FIG. 4 depicts a schematic diagram of one embodiment of a method for selecting content items from a content repository for replication.

FIG. 4 depicts a schematic diagram of one embodiment of a method 400 for selecting content items from a content repository 102 for replication. FIG. 4 depicts a group of content items indicated by rectangular boxes and relationships between the content items indicated by lines with arrows. The relationships depicted by lines with arrows also include a word indicating the type of relationship between the content items.

In the method 400, the GUI 108 receives an input selecting a content item and relationship patterns. For example, the GUI 108 may receive an input selecting the content item labeled "IT requirement" and indicating that content items having relationship patterns of "Drives," "Choose," and/or "Recommends" should be replicated. The GUI 108 may also receive an input indicating that transitive relationships should be honored.

In response to the input, the semantic engine 114 identifies content items corresponding to the relationship patterns selected in the GUI 108. In the example described above, the semantic engine 114 identifies content items labeled "IT requirement," "Architectural Decision," "Architectural Alternative," and "Product." The identified content items 402 may then be replicated.

Figure 5:
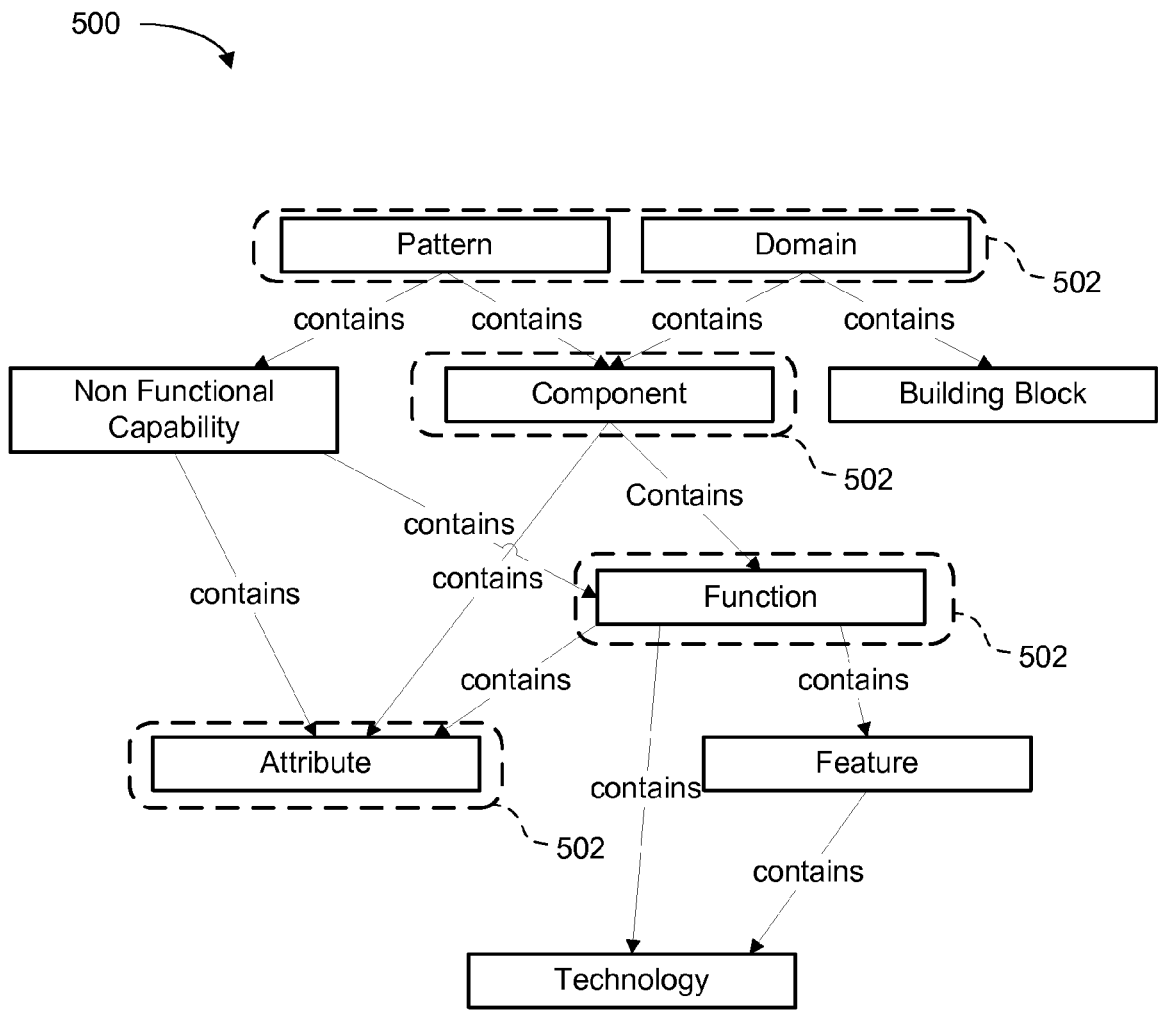
FIG. 5 depicts a schematic diagram of another embodiment of a method for selecting content items from a content repository for replication.

FIG. 5 depicts a schematic diagram of another embodiment of a method 500 for selecting content items from a content repository 102 for replication. FIG. 5 depicts a group of content items indicated by rectangular boxes and relationships between the content items indicated by lines with arrows. For simplicity, all of the relationships in FIG. 5 are a "Contains" relationship.

In the method 500, the GUI 108 receives an input selecting a content item and a threshold value limiting the number of transitive steps that should be honored. For example, the GUI 108 may receive an input indicating that the content items labeled "Pattern" and "Domain" should be replicated along with any content items contained by both the content items labeled "Pattern" and "Domain." The GUI 108 may also receive an input indicating that the semantic engine 114 should honor transitive relationships limited to two or fewer transitive steps.

In response to the input, the semantic engine 114 identifies and selects content items for replication. In the example above, content items labeled "Pattern," "Domain," "Component," "Function," and "Attribute" become selected content items 502. It should be noted that in this example the content items labeled "Feature" and "Technology," while contained by content items "Pattern" and "Domain," are more than two transitive steps away from the initially selected content items and are therefore not selected since their transitive distance exceeds the threshold.

Figure 6:
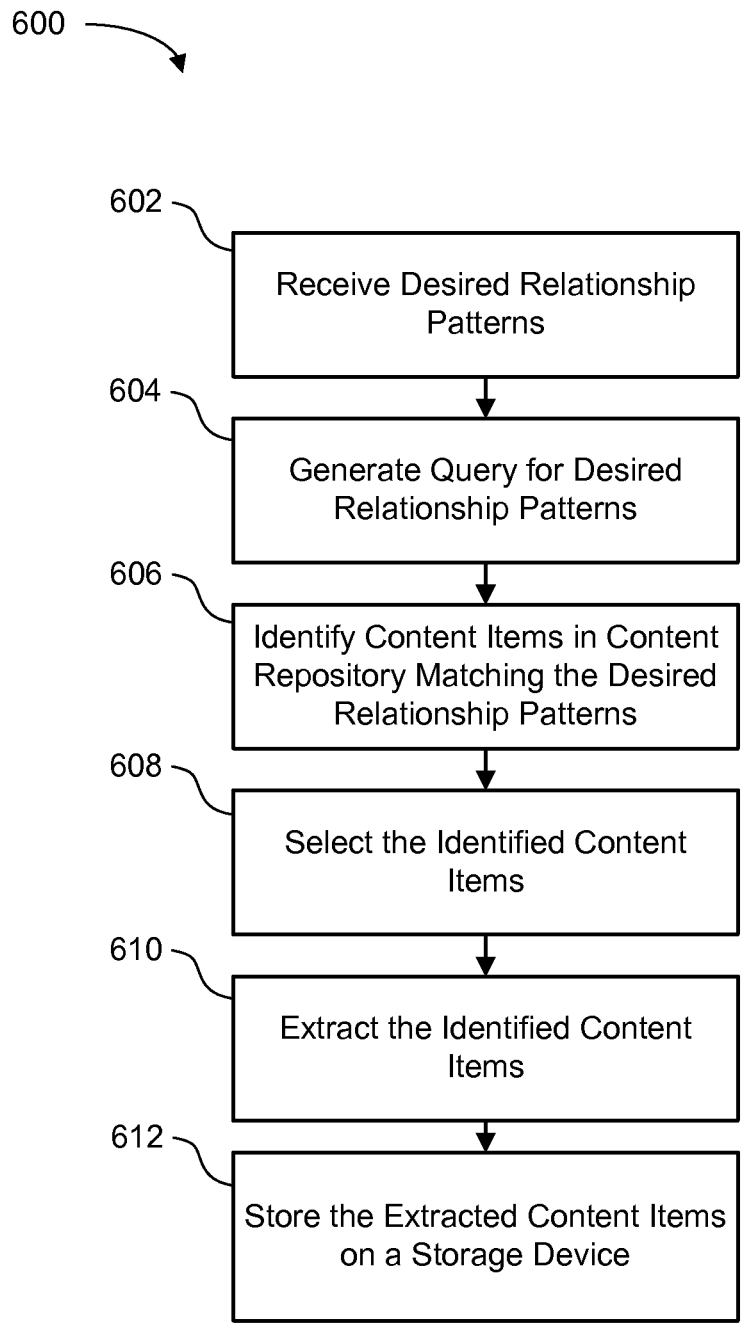
FIG. 6 is a flowchart diagram depicting one embodiment of a method for replicating a portion of a content repository.

FIG. 6 is a flowchart diagram depicting one embodiment of a method 600 for replicating a portion of a content repository. The GUI 108 receives 602 desired relationship patterns for replication. The relationship patterns may include types of relationships, threshold values for transitive steps to honor, types of content items, and/or an allowable size. The query generator 304 generates 604 a query based on the relationship patterns received 602 by the GUI 108. The query may be any type of query capable of being processed by the ontology database 118. For example, the query may be a SPARQL query.

The generated 604 query is processed by the content item identifier 306 to identify 606 content items in the content repository 102 matching the desired relationship patterns. The identified 606 content items are selected 608 by the content item selector 308. The selected 608 content items are extracted 610 by the replication engine 116 and stored 612 on the storage device 107.

It should also be noted that at least some of the operations for the methods may be implemented using software instructions stored on a computer useable storage medium for execution by a computer. As an example, an embodiment of a computer program product for replicating a portion of a content repository includes operations for receiving an input describing one or more desired relationship patterns for replication, generating a query for the desired relationship patterns, and identifying content items of the content repository matching the desired relationship patterns. The computer program product also includes operations for selecting the identified content items of the content repository, extracting the identified content items, and storing the identified content items on a storage device. The input is received at a graphical user interface (GUI). The relationship patterns are associated with an ontology describing relationships between content items in the content repository. The content repository includes two or more content items.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for selecting a portion of a content repository for replication, comprising:

receiving, at a graphical user interface (GUI) operating on a computer, a selection of a content item in a content repository and an input describing one or more desired relationship patterns for replication, the relationship patterns associated with an ontology describing logical relationships between the selected content item and other content items in the content repository, the content repository including a plurality of content items, wherein the content items comprise digital documents, wherein the ontology is stored in one or more tags associated with one or more content items in the content repository;

generating a query for the desired relationship patterns;

identifying the selected content item and related content items of the content repository to replicate to a target storage device based on a storage capacity of the target storage device, wherein the target storage device is separate from the content repository, wherein the related content items comprise a logical relationship with the selected content item based on the desired relationship patterns; and selecting the identified content items of the content repository.

2. The computer-implemented method of claim 1, further comprising extracting the identified content items and storing the identified content items on the storage device.

3. The computer-implemented method of claim 2, wherein the storage device is a portable storage device.

4. The computer-implemented method of claim 1, wherein the GUI comprises a display indicating selected relationship patterns.

5. The computer-implemented method of claim 1, further comprising receiving, at the GUI, an input indicating a maximum allowable size for the selected content items.

6. The computer-implemented method of claim 5, wherein the GUI comprises an indicator to indicate the size of the selected content items relative to the maximum allowable size.

7. The computer-implemented method of claim 1, further comprising receiving, at the GUI, an input deselecting a selected relationship pattern.

8. The computer-implemented method of claim 1, wherein receiving the input describing one or more desired relationship patterns includes receiving, at the GUI, an input describing a desired type of relationship for selected content items.

9. The computer-implemented method of claim 1, wherein receiving the input describing one or more desired relationship patterns includes receiving, at the GUI, an input describing a type of content item to retrieve.

10. The computer-implemented method of claim 1, wherein receiving the input describing one or more desired relationship patterns includes receiving a number of allowed transitive steps for selected content items.

11. The computer-implemented method of claim 1, wherein the query comprises at least one query selected from the group consisting of:

a triple pattern;
a disjunction;
a conjunction; and
an optional pattern.

12. The computer-implemented method of claim 1, wherein the ontology is stored in a triplestore.

13. A computer program product comprising a computer useable storage medium to store a computer readable program, wherein the computer readable program, when executed on a computer, causes the computer to perform operations for replicating a portion of a content repository, the operations comprising:

receiving, at a graphical user interface (GUI) operating on a computer, a selection of a content item in a content repository and an input describing one or more desired relationship patterns for replication, the relationship patterns associated with an ontology describing logical relationships between the selected content item and other content items in the content repository, the content repository including a plurality of content items, wherein the content items comprise digital documents, wherein the ontology is stored in one or more tags associated with one or more content items in the content repository;

generating a query for the desired relationship patterns;

identifying the selected content item and related content items of the content repository to replicate to a target storage device based on a storage capacity of the target storage device, wherein the target storage device is separate from the content repository, wherein the related content items comprise a logical relationship with the selected content item based on the desired relationship patterns;

selecting the identified content items of the content repository;

extracting the identified content items; and storing the identified content items on the storage device.

14. The computer program product of claim 13, wherein the content repository describes a product.

15. The computer program product of claim 13, wherein the content repository is associated with a social network.

16. The computer program product of claim 15, wherein the social network comprises an at least one collaboration mechanism from the group consisting of:

a social structure of individuals and organizations;
email;
instant messaging;
a wiki;
a blog;
media sharing;
collaborative tagging and subject indexing; and
an avatar-based virtual world.

17. The computer program product of claim 13, wherein the storage device is a portable storage device.

18. An apparatus for replicating a portion of a content repository comprising:

a graphical user interface (GUI) to receive a selection of a content item in a content repository and an input describing one or more desired relationship patterns for replication, the relationship patterns associated with an ontology describing logical relationships between the selected content item and other content items in the content repository, wherein the content items comprise digital documents, wherein the ontology is stored in one or more tags associated with one or more content items in the content repository;

a semantic engine to identify the selected content item and related content items of the content repository to replicate to a target storage device based on a storage capacity of the target storage device, wherein the target storage device is separate from the content repository, wherein the related content items comprise a logical relationship with the selected content item based on the desired relationship patterns; and a replication engine to extract the identified content items and store the identified content items on a storage device.

19. The apparatus of claim 18, further comprising a query generator to generate a query for the desired relationship patterns.

* * * * *